Nov. 16, 1965  N. B. WATKINS ETAL  3,217,839
BRAKE STAND FOR SHOPPING CARTS AND THE LIKE
Filed Nov. 29, 1963
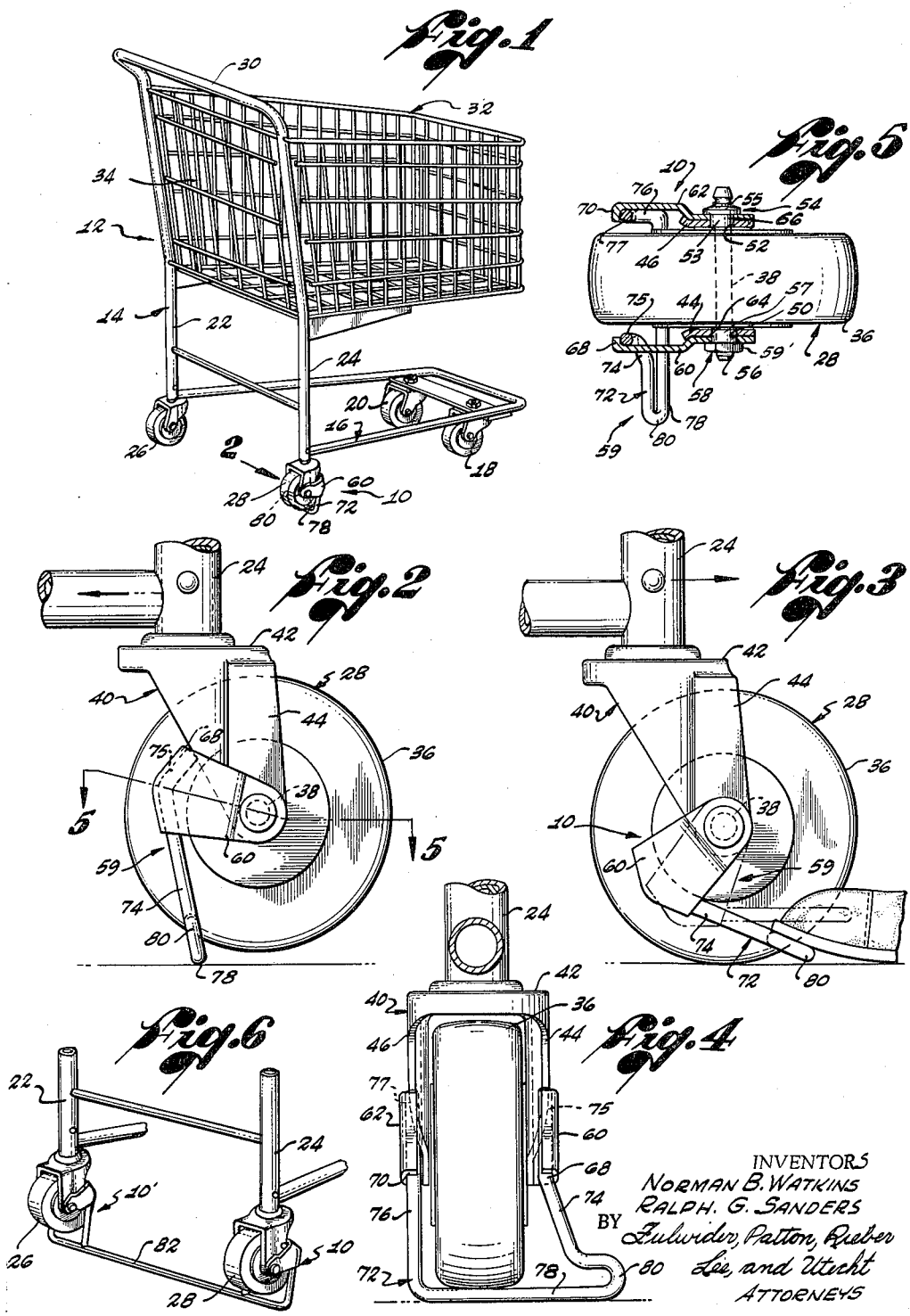
INVENTORS
NORMAN B. WATKINS
RALPH G. SANDERS
BY Fulwider, Patton, Rieber
Lee, and Utecht
ATTORNEYS United States Patent Office 3,217,839
Patented Nov. 16, 1965

3,217,839
BRAKE STAND FOR SHOPPING CARTS
AND THE LIKE
Norman B. Watkins and Ralph G. Sanders, Burbank,
Calif., assignors to Technibilt Corporation, Glendale,
Calif., a corporation of California
Filed Nov. 29, 1963, Ser. No. 326,944
5 Claims. (Cl. 188—4)

The present invention relates to improvements in brake apparatus and, more particularly, to a novel brake for market carts and the like.

Today, in most large grocery stores and markets, carts are provided to allow customers to conveniently serve themselves during shopping. In general, the carts include large baskets supported by a plurality of wheels for easy rolling about the store. The wheels of the carts are generally arranged in aligned pairs, forward and rear. To make the carts easily maneuverable, the wheels are usually of a caster type which swivel about vertical support members for the baskets.

Not only do such carts provide for convenient self-service shopping within stores and markets, but they also are commonly employed to carry customers' purchases to awaiting cars in adjacent parking lots. More often than not, the terrain of the parking lots is uneven and includes many sloping areas necessary for self-drainage of the lots. The carts, being designed for easy wheeling, tend to roll by themselves over such sloping areas particularly when loaded with groceries or packages. Although in certain instances this makes it easy for a customer to wheel his purchases to his car, it is particularly annoying and materially interferes with the safe transfer of the customer's purchases to his car. In particular, undesired rolling of a cart during unloading oftentimes causes groceries to tip over within the cart or to even fall therefrom resulting in spiling, breaking, or bruising of particular items.

Moreover, the unexpected rolling of carts from a stationary position during unloading presents a safety hazard both to other customers and to adjacent autos. Many times, carts rolling from a stationary unloading position have run into unsuspecting customers or have struck parked cars resulting both in personal and property damage.

Also, on a few occasions, runaway carts have played a major role in auto accidents both in parking lots and on streets adjacent to stores and markets.

To combat the problem of undesired cart rolling, some shopping carts include brakes. Generally, the brakes comprise a movable member for engaging a rear wheel of the associated cart. The movable member often takes the form of a plunger normally spring-biased upward away from the wheel. To actuate the brake, foot pressure is exerted on the top of the plunger to force it downward to a locked position against an upper side of the wheel. The brake is released by kicking a release pedal with the side of the foot toward the wheel.

Such conventional brake designs have proven somewhat unreliable. In practice, the plungers usually do not completely lock the associated rear wheels and some rolling of the carts is still permitted. If the wheel is locked, pushing of the cart by an overzealous customers quickly wears a flat spot on the tire.

Furthermore, in operation, the plungers dig into the rubber tires surrounding the wheels. After a number of operations of the brakes, the repeated turning of the wheels with the rolling of the carts digs grooves into the tires which therefore require periodic replacement.

Moreover, such conventional brakes are inconvenient and somewhat difficult to operate, particularly by housewives who do not generally like to risk tearing or soiling their shoes or hose by kicking the side of a market cart.

Further, the dssign of conventional brakes for market carts is relatively complex and expensive to manufacture.

Also, such brakes are structurally fragile and to date, have proven to have a relatively short useful operating life.

With the foregoing problems in mind, it is a principal object of this invention to provide an improved brake for market carts and the like which is reliable in its operation and which prevents undesired rolling of an associated cart during unloading.

It is another object of this invention to provide a brake for carts and the like which is simple in design and inexpensive to manufacture.

It is a further object of this invention to provide a brake for carts and the like which is easily operated by people of all ages without fear of soiling or damaging their person or their clothing.

Another object of this invention is to provide a sturdy brake for carts which requires little if any servicing over long periods of both continuous and periodic use.

The above, as well as other objects and advantages of this invention, may be more clearly understood by reference to the following detailed description when considered with the drawing in which:

FIGURE 1 is a perspective view of a market cart employing a preferred form of the brake of the present invention;

FIGURE 2 is a side view of the brake of FIGURE 1 shown in its operated condition;

FIGURE 3 is a side view of the brake illustrating the manner in which it is operated;

FIGURE 4 is a front end view of the brake as it appears when actuated;

FIGURE 5 is a top view of the preferred form of the brake of the present invention in its actuated position with the wheel-supporting bracket broken away; and FIGURE 6 is a perspective view of another form of brake with the central portion cut away.

In the drawings, the preferred form of brake is represented generally by the numeral 10. In FIGURE 1, the brake 10 is illustrated in its actuated position preventing rolling of a market cart 12.

The cart 12 may be of conventional design such as that shown which includes a frame 14 having a forwardly extending lower structure 16 with wheels or casters 18 and 20 at its forward end. The rear end of the lower structure 16 is connected to vertical support members 22 and 24 of hollow, tubular construction having wheels 26 and 28 at their lower ends. The vertical support members 22 and 24 project upwardly and are joined at their upper ends to form a horizontal handle 30 used in moving and guiding the cart 12. A basket 32 of generally forwardly tapering construction has its rear end firmly supported by the support members 22 and 24. Usually the rear of the basket 32 is closed by a gate 34 supported for rotation at its upper ends by the vertical support members. Due to the generally tapered construction of the basket 32, the front end is adapted to nest within the rear of the basket of a forward cart for storage.

Preferably, the rear wheels 26 and 28 are of a non-swivelling type and at all times are maintained in the direction of the cart 12. The fixed character of the rear wheels cooperates with the brake 10 to prevent turning of the cart 12 when in a stationary position for unloading.

More particularly, the rear wheels 26 and 28 are of similar design and each include a rubber tire 36. The rear wheels are supported in substantially vertical planes for free rotation about horizontal axles 38 by U-shaped yokes 40. As illustrated for the wheel 28, each yoke 40 includes a base portion 42 and a pair of opposing side legs 44 and 46. The base 42 is fixedly secured to the lower end of the support member 24, while the side legs 44 and 46 extend downward from the base 42 to support opposite ends of the axle 38 in coaxial openings 50 and 52, respectively.

By way of example only the brake 10 is operatively associated with wheel 28 and comprises a yoke or U-shaped member 59 having a pair of bracket plates 60 and 62 with aligned openings 64 and 66, respectively. The brake yoke is swingably supported on the ends of the axle 38 outside the supporting yoke 40, with the ends of the axle 38 passing through the openings 64 and 66. As most clearly illustrated in FIGURE 5, the opening 64 receives a threaded end 66 of the axle 58 and an inner portion 57 of a nut 58. The inner portion 57 passes through the opening 50 in the leg 44 of the support yoke 40 and presses against the side of the wheel 28. An outer portion 59 of the nut 58 forms a retaining shoulder slideably contacting the outside of the bracket plate 60 about the opening 64 to retain the bracket plate around the axle 38. The opening 66, on the other hand, receives the inner portion 53 of a head 54 of the axle 38. The inner portion 53 passes through the opening 52 in the leg 46 of the support yoke 40 and presses against the side of the wheel 28 to maintain the wheel on the axle. Meanwhile, an outer portion 55 of the head 54 slideably engages the outer surface of the bracket plate 62 to maintain the bracket plate on the axle 38.

In addition to the openings 64 and 66, the bracket plates 60 and 62 include flanges 68 and 70 at ends opposite the openings. The flanges 68 and 70 are concave toward the openings 64 and 66, respectively, and are designed to receive a bail member 72. The bail member 72 includes opposing side elements 74 and 76 and a substantially flat central portion 78 connecting the side elements. The side elements have bent end portions 75 and 77 extending along and securely nested within the concave flanges 68 and 70, as by welding. The bracket plates 60 and 62, and the bail 72, are designed so that the center of gravity of the combination normally lies below the axle 38 and the bail is in a substantially horizontal position extending rearwardly from the bracket plates around the wheel 28. Expressed differently, in the normal position, counter-clockwise and clockwise forces acting on the brake 10 about the axle 38 are equal, and the bail 72 effectively floats or balances in a substantially horizontal plane above the lowermost surface of the wheel 28 (see the broken line representation in FIGURE 3). The brake 10 is thus normally out of the way of the customer operating the associated market cart and automatically returns to its normal position after a manual rotation of the bail 72 as in the release of the brake.

As illustrated most clearly in FIGURE 4, the central portion 78 of the bail 72 includes an outwardly protruding U-shaped 80 lying in the plane of the bail. The protrusion 80 functions as a foot contact in the actuation of brake 10. To actuate the brake 10, a customer simply places his foot on the protrusion 80 and rotates the bail 72 downward until the flat central portion 78 contacts the ground. With his foot on the protrusion 80, the customer holds the central portion firmly in contact with the ground and pulls the cart backwards relative to the bail. This produces a further rotation of the bail 72 to a position under the wheel 28 as illustrated in FIGURE 2 and raises the wheel slightly off the ground. Depending upon design, either the ends of the bail 72 or the sides of the bracket plates 60 and 62 engage the sloping sidewalls of the legs of the support yoke 40 to stop rotation of the bail with the central portion 78 past the center of the wheel 28 and substantially in line with the vertical support member 24. In this position, the bail 72 is prevented from rotating further forward under the cart 12, while reverse rearward rotation requires a raising of the rear end of the cart. The brake is thus in a locked position to prevent rolling of the cart over the ground. Moreover, since the rear wheel 26 is fixed to and does not swivel under the support member 22, the cart 12 is prevented from swivelling about the wheel 28 when the brake 10 is actuated. Accordingly, the brake 10 maintains the cart 12 in a stationary position to allow the customer to unload his packages without fear that the cart will begin to roll prior to his release of the brake.

To release the brake, the customer simply pushes forward on the handle 30 to cart 12. This rolls the cart 12 forward on the wheels 18, 20 and 26. As the cart begins to roll on the wheel 18, 20, and 26, the central portion 78 of the bail 72 remains in contact with the ground and acts as a pivot for the wheel 28. The wheel 28, in turn, rocks forward and upward about the central portion 78 and then down to contact the ground. When the wheel 28 contacts the ground, the counterclockwise forces acting on the brake 10 about the axle 38 automatically rotate the bail 72 rearward and upward to its normal horizontal position. In the normal position, the counterclockwise and clockwise rotational forces acting on the brake 10 are again equal and the bail 72 effectively floats above the lowermost surface of the wheel 28 ready for another actuation.

Although the brake 10 has been described in association with the wheel 28, it is to be understood that similar brake apparatus may be included on both of the rear wheels of the cart 12. Such an arrangement is particularly useful on carts of a non-nesting type and is depicted in FIGURE 6 by the brakes 10 and 10'. The brakes 10 and 10' are interconnected by a cross bar 82 which extends between inner faces of the brakes. The cross bar 82 provides a foot contact for simultaneously actuating both brakes and may also act as a vertical support member in conjunction with the brakes 10 and 10' for supporting the rear wheels 26 and 28 off the ground when the brakes are actuated.

In summary, the brake of the present invention is extremely simple in design and because of the minimal number of parts employed is very inexpensive to manufacture.

Moreover, due to the rigidity of the bail and its solid connection to the bracket plates, the brake is sturdy and extremely durable.

Furthermore, the brake is easy to operate and may be operated without fear of damaging the shoes or hose of the operator.

Although specific embodiments of the brake have been described in detail herein, they are merely illustrative of the present invention which is to be limited in scope only by the following claims.

We claim:

1. A brake for a wheel supported in a substantially vertical plane for rotation about a horizontal axle, said brake comprising:
   a pair of bracket plates coupled for rotation about opposite ends of said axle in planes substantially parallel to said wheel, said bracket plates each having a support flange concave toward said axle and normally lying with said bracket below said axle;
   a bail having opposing bent end portions nesting in said flanges to support a central portion of said bail around said wheel above the lowermost surface of said wheel;
   and stop means for limiting rotation of said brackets and said bail with said central portion under said wheel.

2. The apparatus defined in claim 1 wherein said bail includes an outward protrusion along said central portion, said protrusion being adapted for foot contact to rotate said bail about said axle.

3. A kickstand-brake for a market cart wheel assembly having a wheel supported in a substantially vertical plane for rotation about a substantially horizontal axle, said kickstand-brake comprising:

a stand having an outer support portion;

means connected to said axle and to said stand for supporting said stand for swinging movement about said axle and for normally balancing said stand with said outer support portion above the lowermost surface of said wheel;

and stop means for limiting the swinging movement of said stand with said outer support portion under said wheel.

4. A kickstand-brake for a market cart wheel assembly having a wheel supported in a substantially vertical plane for rotation about a substantially horizontal axle, said kickstand-brake comprising:

a generally U-shaped bail;

bracket means connected to opposite ends of said axle and to opposite ends of said bail for supporting said bail for swinging movement about said axle and for normally balancing said bail with a central portion of said bail above and to the rear of a lowermost surface of said wheel;

and stop means for limiting the swinging movement of said bail with said central portion of said bail lying under said wheel and forward of said axle.

5. The kickstand-brake defined in claim 4 wherein said bail includes an outward protrusion along said central portion, said protrusion being adapted for foot contact in swinging said bail with said bracket means about said axle.

References Cited by the Examiner

UNITED STATES PATENTS

| | | | |
|---|---|---|---|
| 488,812 | 12/1892 | Homes | 188—4 |
| 690,221 | 12/1901 | Arp et al. | 280—302 X |
| 1,114,028 | 10/1914 | Pawsat | 280—302 |
| 1,213,994 | 1/1917 | Anderson | 280—302 |
| 1,517,808 | 12/1924 | Strniste | 280—302 |
| 1,840,666 | 1/1932 | Grundon. | |
| 3,044,577 | 7/1962 | Lotz | 188—5 |

FOREIGN PATENTS 669,781    1/1939   Germany.

MILTON BUCHLER, *Primary Examiner.*

DUANE A. REGER, ARTHUR L. LA POINT,
*Examiners.*